(12) United States Patent
Magg et al.

(10) Patent No.: US 8,245,628 B2
(45) Date of Patent: Aug. 21, 2012

(54) COFFEE MACHINE AND CONTROL METHOD FOR SAID MACHINE

(75) Inventors: Johann Magg, St. Georgen (DE); Andreas Mayr, Breitbrunn am Chiemsee (DE); Michael Steffl, Marquartstein (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 533 days.

(21) Appl. No.: 10/592,741

(22) PCT Filed: Aug. 31, 2005

(86) PCT No.: PCT/EP2005/054276
§ 371 (c)(1),
(2), (4) Date: Sep. 13, 2006

(87) PCT Pub. No.: WO2006/032601
PCT Pub. Date: Mar. 30, 2006

(65) Prior Publication Data
US 2008/0223218 A1    Sep. 18, 2008

(30) Foreign Application Priority Data
Sep. 24, 2004  (DE) .......................... 10 2004 046 455

(51) Int. Cl.
*A47J 31/58* (2006.01)
(52) U.S. Cl. ........... 99/280; 99/285; 99/302 R; 392/467; 219/433
(58) Field of Classification Search .................... 99/282, 99/283, 295, 279–281, 285, 288, 307, 302 R; 392/467, 480; 219/432, 433, 308, 506–513
See application file for complete search history.

(56) References Cited

U.S. PATENT DOCUMENTS

| | | | |
|---|---|---|---|
| 4,081,660 A * | 3/1978 | Uffer et al. ................... | 219/504 |
| 4,253,385 A | 3/1981 | Illy | |
| 5,283,854 A * | 2/1994 | Schiebelhuth ................ | 392/467 |
| 5,440,972 A | 8/1995 | English | |
| 5,470,019 A * | 11/1995 | Martensson .................... | 237/19 |

(Continued)

FOREIGN PATENT DOCUMENTS
DE  31 22 521   12/1982
(Continued)

*Primary Examiner* — Henry Yuen
*Assistant Examiner* — Jianying Atkisson
(74) *Attorney, Agent, or Firm* — James E. Howard; Andre Pallapies

(57) ABSTRACT

A coffee machine comprising an instantaneous electric heater for heating water, which is transported from a storage tank and conducted under pressure after the heating process into a brewing chamber to prepare the coffee, said chamber comprising an outlet nozzle for discharging the prepared coffee. The machine also comprises at least one sensor for recording an electric measured value that correlates to the temperature of the heated water and a control system for controlling the pump output of the pump and/or the heating output of the instantaneous heater in accordance with the measured value. The device permits a blockage of the nozzle to be identified and safely removed. The control system shuts off the pump output and/or the heating output if the measured value exceeds predefined thresholds and blocks a restart of the pump output and/or heating output for a specified blocking period by activating blocking elements.

19 Claims, 4 Drawing Sheets

U.S. PATENT DOCUMENTS

| | | | |
|---|---|---|---|
| 5,992,298 A | 11/1999 | Illy et al. | |
| 6,000,317 A * | 12/1999 | Van Der Meer | 99/282 |
| 6,082,245 A | 7/2000 | Nicolai | |
| 6,086,064 A * | 7/2000 | Biegelsen et al. | 271/258.01 |
| 2003/0066431 A1 | 4/2003 | Fanzutti et al. | |
| 2004/0168685 A1 * | 9/2004 | Lange | 126/351.1 |

FOREIGN PATENT DOCUMENTS

| | | |
|---|---|---|
| DE | 199 48 785 | 4/2001 |
| EP | 0 771 542 | 5/1997 |
| WO | WO 00/42891 | 7/2000 |
| WO | WO 03/030696 | 4/2003 |

\* cited by examiner

COFFEE MACHINE AND CONTROL METHOD FOR SAID MACHINE

The invention relates to a coffee machine.

Coffee machines in the prior art operate according to different principles. The most common models are the so-called pressureless coffee machines. In these water flows from a storage container into an electrically heatable pipe. Particularly as a result of the evolution of steam in this pipe, heated water is then pushed through a riser to an outlet via which the heated water then drips into a coffee filter. The filtered coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates on a different principle, it is provided to first transfer the water for preparing the coffee from a water container into a heatable intermediate container. From this intermediate container the heated water is passed to an electric-motor-driven pump from which it is supplied at elevated pressure, for example 2 to 3 bar, to a coffee grounds receiving device provided in a sealed brewing chamber.

In a particular form of coffee machine provided with a brewing chamber, designated as a so-called coffee pad machine, it is provided that unlike in the espresso machine the coffee is not introduced into the coffee grounds receiving device in loose form as coffee grounds but is inserted in a retainer in the form of a coffee pad, that is, in compacted form surrounded by filter paper. The retainer is located in a brewing chamber which is formed from a brewing-chamber upper part and a brewing-chamber lower part which can be connected thereto in a sealed manner. Heated water or steam is fed into the brewing chamber via the upper part. The retainer for the coffee pads can be part of the upper part or inserted as a separate part therein. The brewing-chamber lower part has an outlet opening from which the prepared coffee can emerge. The retainer can be configured so that the heated water or the steam can flow largely unhindered through the coffee pad.

A coffee machine for preparing coffee based on coffee pods is known from WO 03/030696 A1. This comprises a continuous flow heater for heating the brewing water. Furthermore, a temperature sensor is provided, this being used to determine whether a predetermined water temperature is achieved within a predetermined time, i.e. whether the heater is functioning correctly or, for example, it cannot provide sufficient heating power as a result of an electrical defect or as a result of scaling. In this case, the machine is shut down again and a warning light comes on.

A disadvantage with this known coffee machine or the control program for this machine is that in the event of a nozzle blockage, functional disorders occur the cause of which cannot easily be identified by the user. The visible sign of the functional disorder for the user, namely a lack of coffee being conveyed, can have numerous causes, including incorrect operation, so that the user has no starting point for eliminating the functional disorder. However, if suitable measures are not taken quickly in the event of a nozzle blockage, the appliance can be damaged. The water located in the continuous flow heater which cannot escape because of the nozzle blockage, is heated for longer than intended which can result in the formation of steam and the production of a harmful excess pressure.

It is the object of the invention to improve a generic coffee machine such that a nozzle blockage can be recognised and safely eliminated.

The invention is based on the generic coffee machine in that the control system shuts off the pump output and the heat output if the measured value exceeds predefined thresholds and blocks a restart of the pump output and the heat output for a specified blocking period by activating blocking elements.

This invention implements a concept comprising a plurality of interacting components: an element usually provided in known coffee machines, namely a temperature sensor, is advantageously used to provide a safeguard against the overpressure which occurs in the event of a nozzle blockage. It is not necessary to install a special pressure sensor according to the invention which would involve additional effort and costs. Rather, the invention makes use of the knowledge that the excess pressure is a consequence of excess heating which for its part can be attributed to lack of outflow because of the nozzle blockage. An easily accessible parameter is thus measured whose excursion from a predefined desired range is used firstly to identify the basic cause (nozzle blockage) and secondly to initiate defensive measures to prevent harmful consequences (excess pressure).

The defensive measures firstly involve eliminating the acute danger. Any further rise in pressure is counteracted by immediately shutting off the heating. Optionally shutting off the pump in addition to shutting off the heat output results in further pressure relief so that the risk of damage to the appliance is effectively eliminated. Secondly, the blocking of a restart results in a permanent safeguard since a renewed pressure build-up is prevented whilst the nozzle is still blocked. At the same time, the user identifies from the behaviour of the machine control that the nozzle blockage is a cause of the functional disorder.

In an advantageous embodiment it is provided that the control system comprises a time switch for activating and/or deactivating the blocking elements. It is thus possible to specify the blocking period by defining a time interval. The time interval should preferably be selected to be so long that the machine can cool down sufficiently and enable the blocked nozzle to be cleaned.

Alternatively or additionally, it can be provided that the control system comprises at least one sensor for detecting a relevant event for deactivating the blocking element.

In one embodiment of the invention, the sensor can be a temperature sensor for detecting a re-entry of the measured temperature value within the predefined limits. A restart can thus be prevented at least while the temperature of the system lies above a critical value.

In another embodiment of the invention it is provided that the sensor is an opening sensor for detecting opening of the brewing chamber. The opening of the brewing chamber can be an indication that the user is attempting to reach the blocked nozzle for cleaning. In one embodiment a restart is prevented until measures have been taken to eliminate the cause of the functional disorder.

Naturally it is also possible to use a plurality or all the aforesaid features for specifying the blocking period. In particular, a time switch is used to define a minimum blocking time but an actual restart is additionally made dependent on the occurrence of one or a plurality of specific events.

A signal generator is favourably provided to produce an alarm signal when a shut-off is caused by the measured value exceeding the limits. By this means the attention of the user can be expressly drawn to the nozzle blockage as a cause of the functional disorder and this can be eliminated without complex troubleshooting. Visual displays in the form of warning lights, alphanumeric displays and similar or alarm sound generators can be used as signal generators.

In a particularly preferred embodiment, it can be provided that a signal generator is provided to produce an alarm signal during the blocking period. This can be the aforesaid or a separate signal generator. Such a signal generator indicates to the user that the blocking time has elapsed.

The invention builds on the generic control method in that the pump output and/or the heating output are shut off when the measured value exceeds predefined thresholds and restarting the pump output and/or the heat output is blocked for a specified blocking period. In this way, the advantages and particular features of the coffee machine according to the invention are implemented within the control method. This also applies to the preferred embodiments of this method.

It can favourably be provided that the specification of the blocking period comprises predetermining a minimal blocking period. This ensures, independently of any further conditions for the release of a restart, that particularly relevant parameters such as the temperature of the brewing water have sufficient time to return to the non-critical range.

Alternatively or additionally, it can be provided that the specification of the blocking period depends on an event detected by at least one sensor.

It can be particularly favourable if the event is the re-entry of a measured temperature value within the predefined limits. In this way, the attainment of non-critical ranges of values can be detected directly.

In another embodiment, it is provided that the event comprises an opening of the brewing chamber or more advantageously, cleaning the nozzle. For example, the removal of the nozzle can be detected by suitable measuring means. In this way, the elimination of the cause of the functional disorder can be detected in a particularly direct manner.

Naturally, some or all of the aforesaid measures can also be combined in a particularly favourable control method.

In an advantageous embodiment it is provided that a user signal is generated in the event of a shut-off caused by the measured value exceeding the limits. In this case, it can be particularly useful if the user signal is generated for the duration of the blocking period. The attention of the user is thereby expressly drawn to the cause of the functional disorder and/or the elapse of the blocking time.

The invention is explained in detail with reference to the figures. In the figures.

Figure 1:
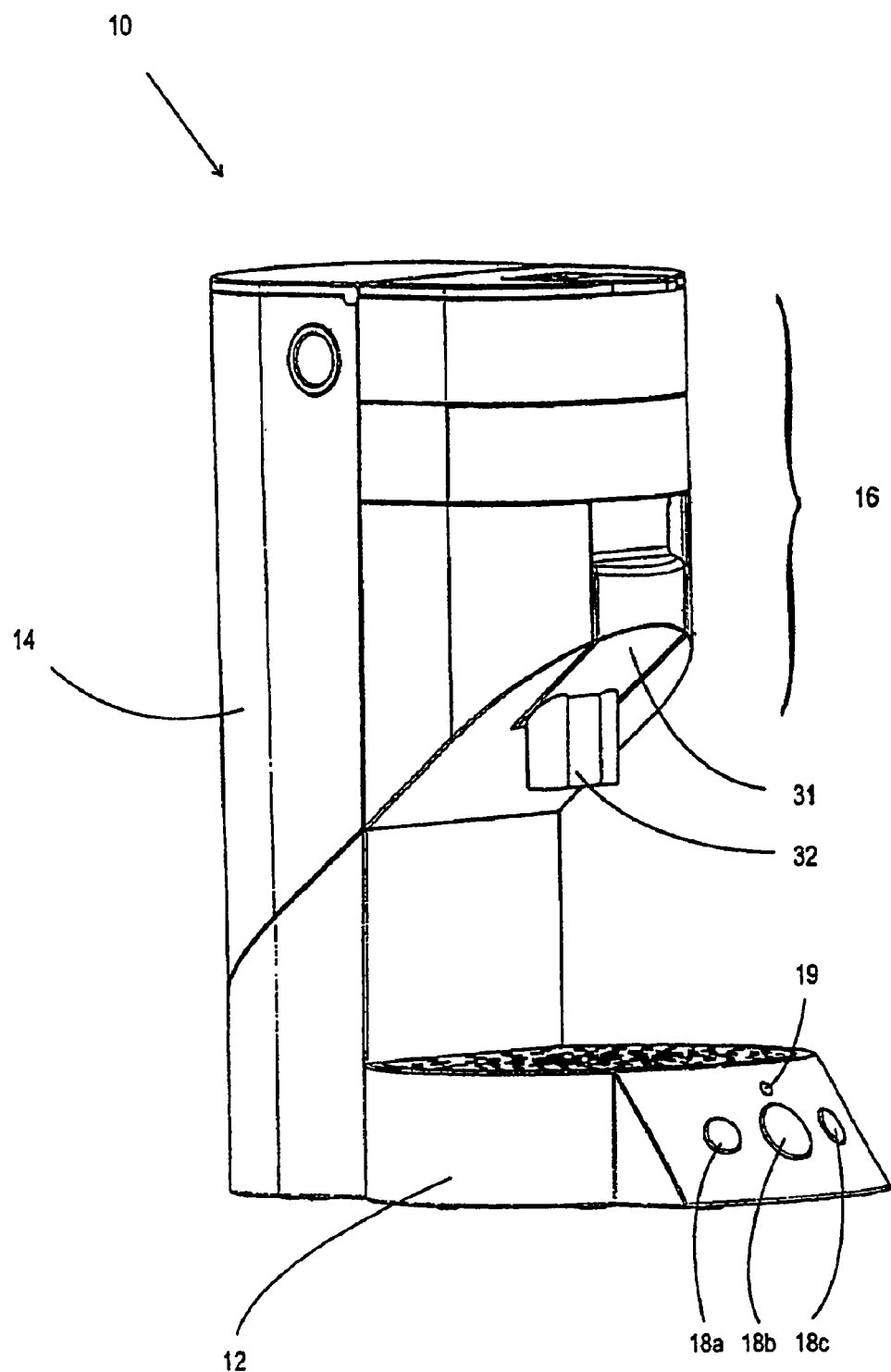
FIG. 1 is a perspective view of a coffee machine according to the invention.

FIG. 1 shows a perspective view of a coffee machine 10. The coffee machine 10 comprises a flat stand part 12, a pillar-like storage and operating part 14 and a coffee preparation part 16. The coffee preparation part 16 is arranged above the stand part 12 on the storage and operating part. A control panel provided with a plurality of operating buttons 18a, 18b, 18c and a control light 19 is arranged in the front area of the stand part 12.

Figure 2:
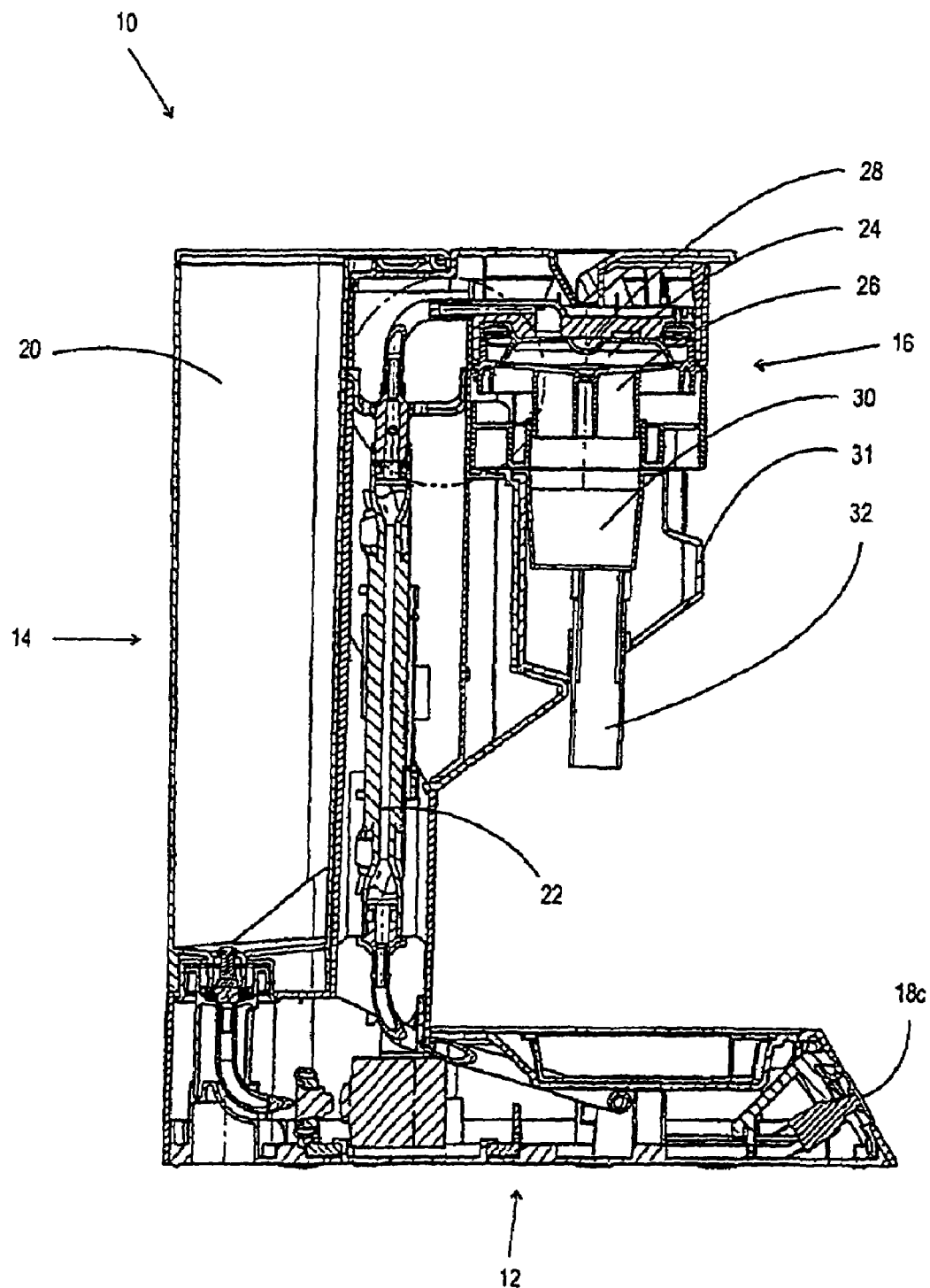
FIG. 2 is a sectional view of the coffee machine from FIG. 1.

FIG. 2 shows a sectional view of the same coffee machine 10. The storage and operating part substantially comprises a water tank 20, a continuous flow heater 22, a pump not shown and various connecting lines between said elements. The coffee preparation part 16 comprises a brewing chamber 24, comprising a lower part 26 and an upper part 28. Provided below the brewing chamber 24 is an outlet pot 30 into which prepared coffee runs from the brewing chamber 24. The outlet pot 30 has an outlet pipe 32 via which prepared coffee runs into a collecting container, e.g. a cup, provided on the stand part 12. The outlet pot is surrounded by an outlet housing 31.

Figure 3:
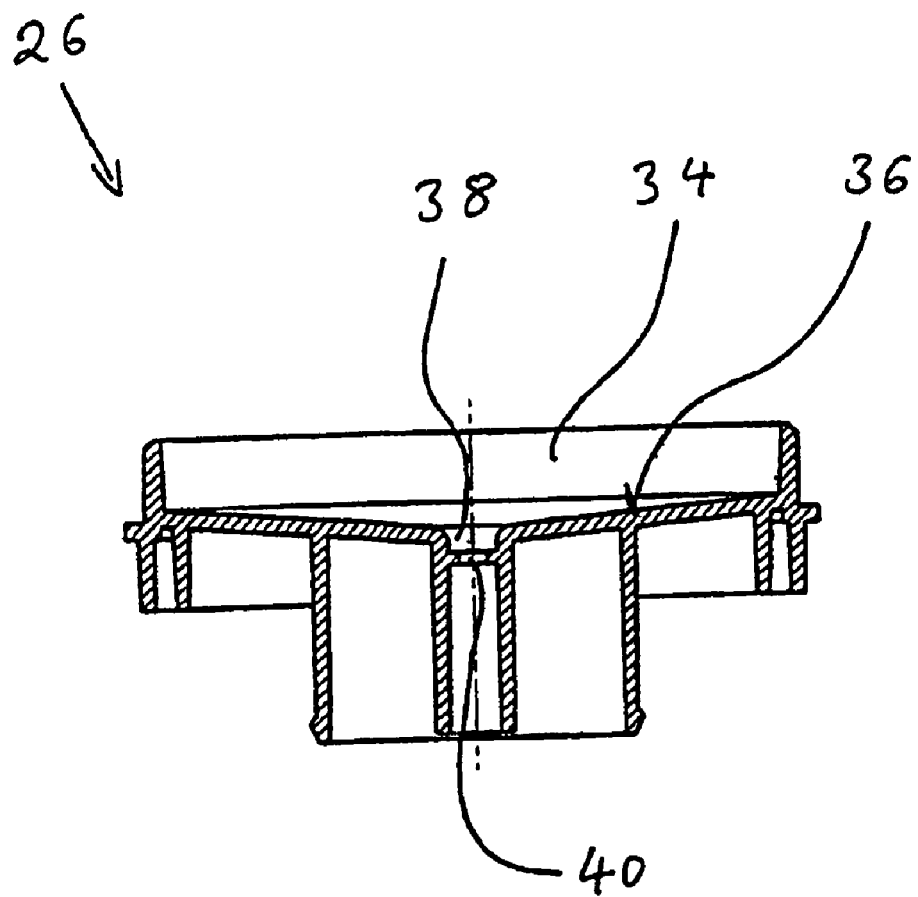
FIG. 3 is a sectional view of a brewing-chamber lower part of the coffee machine from FIG. 1.

FIG. 3 shows a sectional view through the brewing-chamber lower part 26. This brewing-chamber lower part 26 comprises a preferably round receptacle 34 for coffee pads (not shown). The base 36 of the receptacle 34 is preferably constructed as descending towards a central recess 38. For preparing coffee, the brewing-chamber lower part 26 is connected to a brewing-chamber upper part, not shown in FIG. 3 in a sealed manner so that heated brewing water can pass through the coffee pad in the receptacle 34 under pressure. The coffee is sprayed through a nozzle 40 in the central recess 38 into the outlet pot 30 located under the brewing chamber 24.

Figure 4:
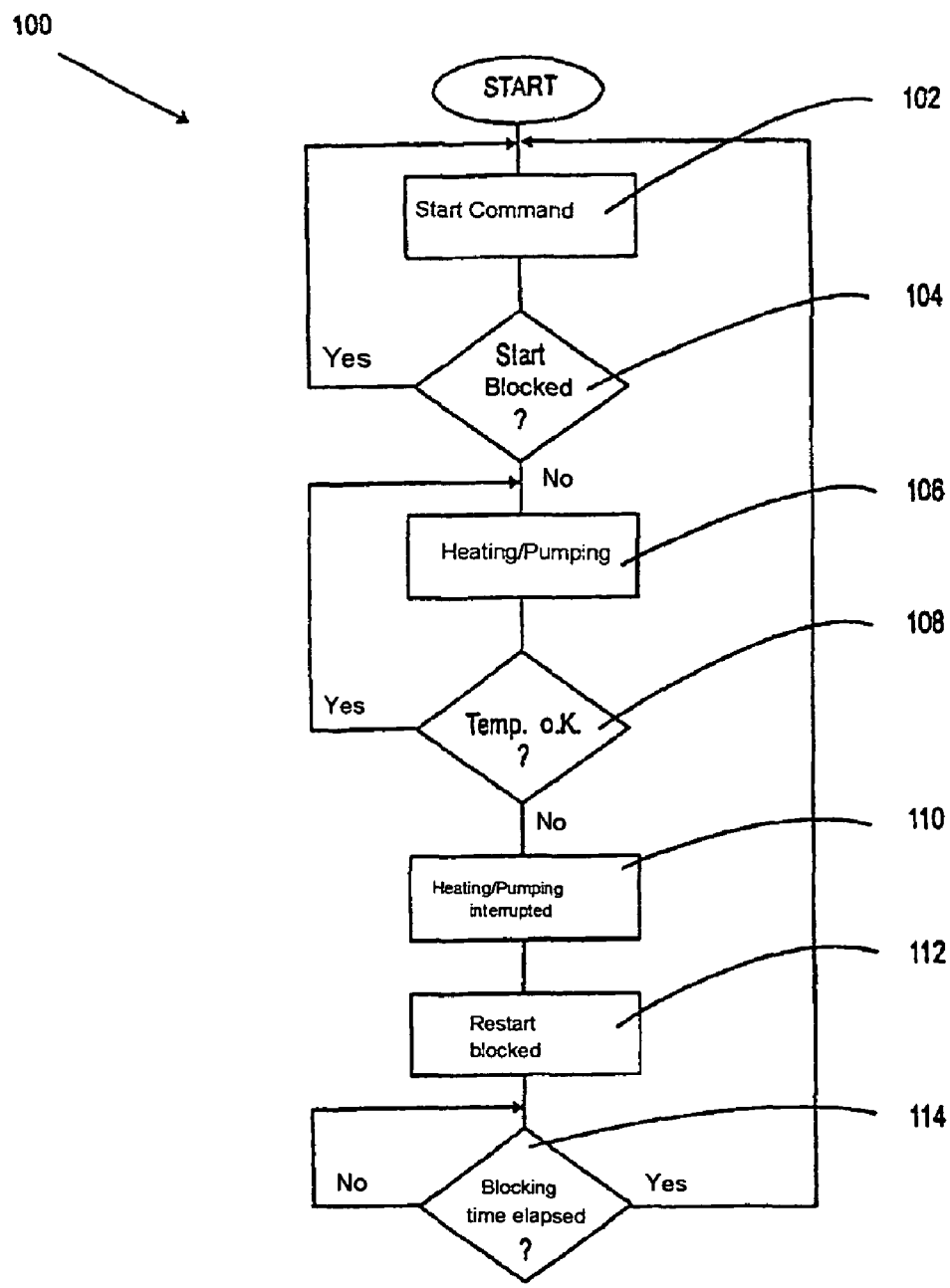
FIG. 4 is a flow diagram of the control method according to the invention.

FIG. 4 shows a simplified flow diagram to illustrate the control method 100 according to the invention. The method 100 begins at step 102 with the starting command of the user. If the start is not blocked, which is checked in step 104, the machine begins to prepare coffee in step 106, as is designated as "heating/pumping" in FIG. 4. In fact, this step can comprise a complex sequence with its own possibilities for variation and interruption. A temperature monitoring step 108 takes place in parallel with step 106. In this step, the signal from a temperature sensor disposed at a suitable position, preferably directly in front of the brewing chamber is compared continuously or at predetermined time intervals with a temperature threshold. If the measured brewing water temperature lies below the threshold, the heating/pumping step 106 is continued. However, if the brewing water temperature exceeds the threshold, this means that the nozzle 40 is presumably blocked so that the brewing water is excessively heated and there is a risk of excess pressure being produced. In this case, the method 100 continues with step 110, namely interruption of the heating/pumping step 106. At the same time, in a particularly favourable embodiment, a restart is blocked (step 112). The elapse of a proposed blocking time is monitored in step 114. This can be accomplished by monitoring a time interval or monitoring certain sensors for predefined events, for example, opening the brewing chamber. Restarting is blocked until the blocking time has elapsed as determined in step 114. However, if it is established in step 114 that the blocking time has elapsed, the process returns to the beginning so that a new start command (step 102) results in a rerun of the method 100 described.

The features of the invention disclosed in the preceding description, in the drawings and the claims can be important for implementing the invention individually and in any combination.

Reference List
10 Coffee machine
12 Stand part
14 Storage and operating part
16 Coffee preparation part
18a-c Control buttons
19 Indicator light
20 Water tank
22 Continuous flow heater
24 Brewing chamber 26 Brewing-chamber lower part
28 Brewing-chamber upper part
30 Outlet pot
31 Outlet housing
32 Outlet pipe
34 Receptacle
36 Receptacle base
38 Central opening
40 Nozzle
100 Control method
102-114 Process steps of 100

The invention claimed is:

1. A coffee machine, comprising an electric continuous flow heater for heating water, which is transported from a storage tank by means of a pump and is conducted under pressure after the heating process into a brewing chamber to prepare the coffee, said brewing chamber comprising an outlet nozzle for discharging the prepared coffee, the coffee machine comprising at least one sensor for recording an electric measured value that correlates to the temperature of the heated water and a control system for controlling at least one of the pump output of the pump and the heating output of the continuous flow heater depending on the electric measured value, at least one of the pump output and the heating output being shut off by the control system and with a restart blocked for a predetermined blocking time period under control of the control system by activating blocking elements when the electric measured value exceeds predefined limits, wherein the predetermined blocking time period comprises a predetermined minimal blocking period, the control system being programmed to unblock the restart after at least the predetermined blocking time period has elapsed without disconnecting a current source.

2. The coffee machine according to claim 1, wherein the control system comprises a time switch for activating and deactivating the blocking elements.

3. The coffee machine according to claim 1, wherein the control system comprises at least one event sensor detecting a relevant event for deactivating the blocking elements.

4. The coffee machine according to claim 3, wherein the at least one event sensor is a temperature sensor detecting a re-entry of the electric measured value within the predefined limits.

5. The coffee machine according to claim 3, wherein the at least one event sensor is an opening sensor detecting opening of the brewing chamber.

6. The coffee machine according to claim 1, further comprising a signal generator producing an alarm signal when a shut-off is caused by the electric measured value exceeding the predefined limits.

7. The coffee machine according to claim 6, wherein the signal generator produces an alarm signal during the blocking period.

8. The coffee machine according to claim 6, wherein the coffee machine includes an espresso machine.

9. The coffee machine according to claim 6, wherein the coffee machine includes a coffee pad machine.

10. A control method for a coffee machine, comprising an electric continuous flow heater for heating water, which is transported from a storage tank by means of a pump and is conducted under pressure after the heating process into a brewing chamber to prepare the coffee, said brewing chamber comprising an outlet nozzle for discharging the prepared coffee, the coffee machine comprising at least one sensor for recording an electric measured value that correlates to the temperature of the heated water, wherein at least one of the pump output of the pump and heating output of the continuous flow heater are varied depending on the electric measured value, the method comprising:
shutting off at least one of the pump output and the heating output when the electric measured value exceeds predefined thresholds;
activating blocking elements to thereby block restarting the at least one of the pump output and the heat output for a predetermined blocking time period, wherein the predetermined blocking time period comprises a predetermined minimal blocking period; and
unblocking the restart after at least the predetermined blocking time period has elapsed without disconnecting a current source.

11. The method according to claim 10, wherein the predetermined blocking time period comprises predetermining a minimal blocking period.

12. The method according to claim 10, wherein the blocking elements are deactivated depending on an event detected by at least one event sensor.

13. The method according to claim 12, wherein the event comprises an opening of the brewing chamber.

14. The method according to claim 12, wherein the event comprises cleaning the nozzle.

15. The method according to claim 10, wherein a user signal is generated in the event of a shut-off caused by the electric measured value exceeding the predefined thresholds.

16. The method according to claim 15, wherein the user signal is generated for the duration of the blocking period.

17. The method according to claim 15, wherein the coffee machine includes an espresso machine.

18. The method according to claim 15, wherein the coffee machine includes a coffee pad machine.

19. A method for controlling a coffee machine comprising a continuous flow heater, a storage tank, a pump, a brewing chamber having an outlet nozzle for discharging prepared coffee, a control system, and a sensor, the method comprising the acts of:
transporting water from the storage tank to the brewing chamber with the pump;
heating water with the continuous flow heater;
conducting water into the brewing chamber under pressure;
detecting a measured value with the sensor that correlates to the temperature of the water;
the control system varying at least one of the pump output of the pump and heating output of the continuous flow heater in response to the measured value;
the control system shutting off, for a predetermined blocking time period under control of the control system at least one of the pump output and the heating output when the measured value exceeds a predefined threshold, wherein the predetermined blocking time period comprises a predetermined minimal blocking period;
unblocking the restart after at least the predetermined blocking time period has elapsed without disconnecting a current source; and
restarting the at least one of the pump output and the heat output.

* * * * *